May 17, 1949.   A. R. BOLLAERT ET AL   2,470,332
DECOLORIZATION AND CLARIFICATION OF SUGAR LIQUORS
Filed Sept. 29, 1945   2 Sheets-Sheet 1

A. R. BOLLAERT
G. G. HALVORSEN
INVENTORS

ATTORNEY

May 17, 1949.　　　A. R. BOLLAERT ET AL　　　2,470,332
DECOLORIZATION AND CLARIFICATION OF SUGAR LIQUORS
Filed Sept. 29, 1945　　　　　　　　　　　　　2 Sheets-Sheet 2

NO. 1 ············
NO. 2 ------
NO. 3 -·-·-·-
NO. 4 -··-··-
NO. 5 ————

A. R. BOLLAERT
G. G. HALVORSEN
INVENTORS

ATTORNEY

Patented May 17, 1949

2,470,332

UNITED STATES PATENT OFFICE 2,470,332

DECOLORIZATION AND CLARIFICATION OF SUGAR LIQUORS

Armand R. Bollaert, Palos Verdes Estates, and Gordon G. Halvorsen, Manhattan Beach, Calif., assignors to Great Lakes Carbon Corporation, a corporation of Delaware Application September 29, 1945, Serial No. 619,412

5 Claims. (Cl. 127—50)

This invention pertains to the clarification and partial decolorization of solutions of sugar by the use of calcium phosphate as a defecant.

More specifically, the invention relates to a particular manner of producing a precipitate of calcium phosphate in a sugar solution, through the use of which the precipitate and adhering impurities may be removed readily and completely from the solution without impairing the purifying and decolorizing effect of the precipitation.

It has long been known that when phosphoric acid and a slurry of calcium hydroxide are added in small quantities to a solution of raw sugar a flocculent, amorphous precipitate of calcium phosphate is formed, the reaction presumably being

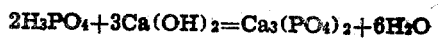

$$2H_3PO_4 + 3Ca(OH)_2 = Ca_3(PO_4)_2 + 6H_2O$$

It is also well known that when such a precipitate is produced in and thereafter removed from a raw sugar solution, a material improvement in its color and clarity may be obtained, as compared with straight filtration with the same diatomaceous earth filter-aid, the flocculent phosphate entrapping and adsorbing gums, mucilages and other colloidal impurities to which a part of the original color of the solution is due.

This method of defecation came at one time into rather extended use but encountered difficulties which led to its being generally abandoned in favor of simple clarification with diatomaceous earth filter-aids. The precipitate, which with careful handling may be produced in the form of coarse flocs in the mixing tank, is so tender that it is broken down and dispersed by any strong agitation of the liquid in which it is suspended, and proved to be practically nonfilterable, and the benefits both in color removal and in clarity are materially reduced. Even with the use of the best filter-aids the filtrate cannot be brought to satisfactory clarities and the filters rapidly choke and glaze, giving filtration cycles too short to be practicable.

In the previous use of calcium phosphate as a defecant it has been the practice to add the reagents, usually with the addition of a filter-aid, to a batch of the sugar liquor in a blending tank, the batch being agitated to disperse the reagents and maintained in agitation during the progress of the ensuing filtration. An alternative process, which is still in use to some extent, passes the liquor containing the precipitate over settling tables on which the floc is deposited by gravity, this method yielding a liquor which must further be filtered for clarification and being somewhat difficult to control. As neither of these methods is wholly satisfactory in practice, the use of calcium phosphate as a defecant has fallen into general disuse, most sugar houses placing their reliance on a simple clarification with diatomaceous earth filter-aids. Such filter-aids, properly selected and used in pressure filtration, may be made to produce substantially perfect clarity but make little if any improvement in the color of the liquor.

We have discovered that if at least one of the above named reagents (phosphoric acid and calcium hydroxide) be added to a stream of the sugar liquor between the discharge of the filter press pump and the press intake, and the stream be passed through a step of agitation only sufficient to mix the liquids, the resultant floc may be passed into the press in such form as to be readily filterable. In fact, the floc in this form acts to some extent as a filter-aid, improving the clarity which would be obtained by the use of an equal dose of a filter-aid alone, while at the same time maintaining to the fullest extent the bleaching effect which follows from the use of the precipitated phosphate. Thus the load on the press installation is not increased by the use of the phosphate treatment, while the load on the bone char filtration is greatly reduced.

The manipulation of the process and the results obtained with it may best be explained with reference to the attached drawings, in which Fig. 1 is a diagrammatic flow-sheet of a plant adapted to the practice of the invention;

Figure 1:
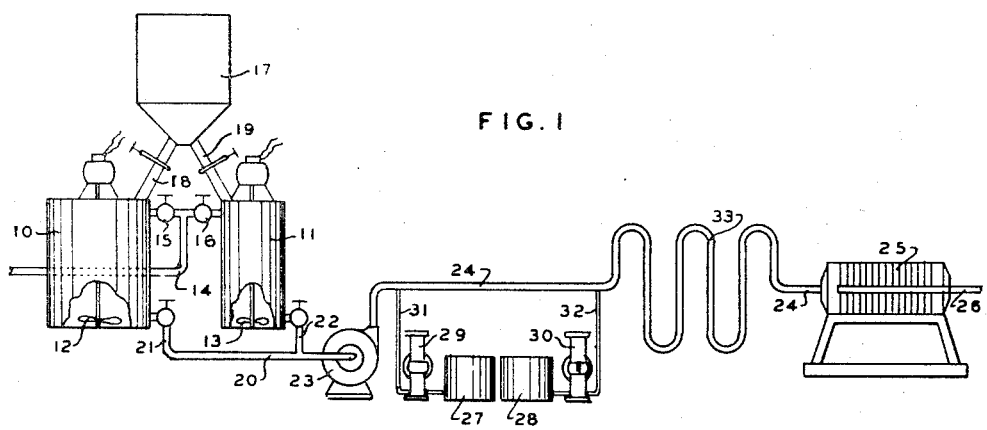

Referring first to Fig. 1, two mixing tanks 10 and 11 are provided respectively with propellers 12 and 13 or with other mixing means. As filter-aids only are added to the liquor in these tanks, it is not necessary to avoid strong local agitation. These tanks are supplied with sugar liquor from a source not shown by a main pipe line 14 with valved branches at 15 and 16. The tanks are also supplied with a diatomaceous earth filter-aid from a bin 17 having valved outlet pipes 18 and 19, which may include mechanical feeders if desired.

In tank 10 the sugar liquor is dosed with a suitable quantity and kind of filter-aid, both of which will be referred to hereinafter. In tank 11 a filter-aid slurry containing a considerably larger proportion of solids is prepared.

A filter feed line 20 having valved branches at 21 and 22 connects the two tanks with the suction of a filter feed pump 23, which for example may be a high speed centrifugal pump. A discharge pipe 24 connects the pump with the feed end of any filter press 25, from which filtered liquor is discharged at 26.

Two reagent tanks 27 and 28 are provided with separate pressure pumps 29 and 30, the discharge pipes 31 and 32 from these pumps connecting into the filter feed line 24 at spaced points between pump 23 and press 25. These tanks are adapted to contain respectively a solution of o-phosphoric acid and a thin slurry or milk of lime. For reasons hereinafter stated it is preferable to introduce the acid into the liquor stream in advance of the lime, and in that case the acid solution would be prepared in tank 27 and the lime slurry in tank 28.

Between the point of junction of pipe 32 and the filter press it is desirable to provide a means for gently intermixing the sugar solution with the reagents, and this means may take the form of a reversed pipe coil 33 interposed in feed pipe 24, or any preferred form of baffling arrangement may be used so long as it does not set up turbulence by which the flocs could be broken down.

It will be understood that the apparatus above described is suggestive only and in nowise limiting, and further that it includes only the bare essentials of a functional apparatus. Automatic feeders and proportioners add to the convenience of the plant, tankage may be duplicated to cause it to operate continuously, and any type of filter press may be used. One of the major advantages of the procedure is that it may be put into practice in any sugar house having a filter station adapted to diatomaceous earth clarification, with only trivial additions and without reduction in capacity.

The above described plant is operated in the following general manner. A slurry of a suitable diatomaceous earth filter-aid, prepared in advance, is pumped from tank 11 into the press until the filter cloths are precoated with about 0.1 pound (dry weight) of earth per square foot. The filtrate from this precoating step is returned for reclarification or, if preferred, water may be used as a vehicle for the earth in precoating.

Tank 10 is meanwhile filled with the liquor to be purified, and from 0.2% to 0.5% (of the weight of sugar in the solution) of a suitable filter-aid is dispersed through the liquid and kept in suspension while filtration is in progress. In practice, continuous feeds of liquor and of earth may be introduced into the feed tank, keeping it constantly charged with liquor containing the required proportion of solids.

Pumps 23, 29 and 30 are then started, the speed of pump 23 being regulated to maintain either a desired pressure at the intake of the press or a desired flow rate at its discharge. The relative speeds of pumps 29 and 30 are regulated to introduce the optimum proportion of phosphoric acid together with such quantity of calcium hydroxide as suffices to neutralize the acid and bring the hydrogen ion concentration of the filtrate to approximately pH 7.0. Ordinarily the dosage of phosphoric acid, figured as $P_2O_5$, will be within the range 0.005% to 0.025% of the weight of sugar, and the ratio of $P_2O_5$ to $Ca(OH)_2$ will be of the order of the combining weights, or about 1.00:1.56.

One of these reagents, preferably the acid, is introduced into the filter feed stream far enough in advance of the other to permit it to diffuse through the liquor before contact occurs. On the addition of the second reagent and passage of the stream through coil 32 or other mixing means, a precipitate of calcium phosphate is formed in large flocs which pass into the filter without being broken down and are filtered out with great ease.

The result of this operation is a fully clarified filtrate, partially decolorized, and a relatively large quantity of filtrate for each press cycle, as described in more detail below.

Improvement in the color of the sugar liquor is inherent in the application of the calcium phosphate treatment, but this improvement has heretofore been substantially unavailable because of the difficulty in subsequent clarification. Filtration with the use of diatomaceous earth filter-aids makes substantially no improvement in color but produces perfect clarity in the absence of calcium phosphate and has heretofore not been applicable to liquors containing this precipitate under conditions ordinarily obtaining in a sugar house filter station. The purpose of the present invention is to enable the known benefits of the phosphate treatment to be obtained in a process ensuring rapid filtration and satisfactory clarity, a result not heretofore attained.

The most desirable manipulation of the new process is, therefore, that which permits any desired quantities of the decolorizing reagents to be used without interference with the diatomaceous earth clarification. To determine the best details of manipulation a large number of laboratory experiments and comparisons were made, with the results set forth below.

COLOR REMOVAL

The proportion of the original color removed by the phosphate treatment will vary with the depth of the treatment and also with the characteristics of the sugar. In the following comparisons the depth of color was determined in the Holven-Gillette tyndallometer and the improvement translated into terms of percentage of the original color by dilution and matching. For example, a color removal of 30% indicates that the color of the treated and clarified liquor was matched by a blend of 70 parts of the original liquor with 30 parts of a refined sugar solution having the color and clarity of distilled water, the color readings being made on clarified samples.

The following table shows the improvements in color obtained when three different raw sugars were clarified with diatomaceous earth and when they were treated with two different dosages of phosphoric acid and a suitable relative proportion of lime.

Table 1

| | Percentage Color Removed | | |
|---|---|---|---|
| | Sugar #1 | Sugar #2 | Sugar #3 |
| | Per cent | Per cent | Per cent |
| Filtered, no phosphate | None | None | None |
| Treated, 0.01% $P_2O_5$ | 30 | 28 | 39 |
| Treated, 0.02% $P_2O_5$ | 50 | 40 | 52 |

EFFECT OF ORDER OF ADDITION OF REAGENTS

Both the order in which the reagents are introduced into the stream passing to the press and the pH to which the filtrate is brought by the control of the lime have a definite effect on the removal of color. In the tests of which the results are tabulated below the first column shows the results when the acid was followed by the lime, the second the results when lime was added first and followed by acid. The original pH of the liquor, after clarification only, was 6.8 and the dosage of acid, in terms of $P_2O_5$, was 0.02% of the weight of sugar.

Table 2

|  | Percentage color removed | |
|---|---|---|
|  | Acid First | Lime First |
|  | Per cent | Per cent |
| pH controlled at 6.8 | 46 | 41 |
| pH controlled at 7.3 | 40 | 35 |
| pH controlled at 7.7 | 36 | 34 |

EFFECT OF ORDER OF ADDITION ON LIME CONTENT

When the lime is added first and followed by acid the lime content of the treated liquor is slightly below that of the untreated solution. When the order of addition is reversed, an appreciable reduction in lime content is obtained by the treatment. In the following comparison lime is expressed as CaO in percent of the weight of sugar.

|  | Per cent |
|---|---|
| Filtered liquor, no treatment | 0.0198 |
| Treated 0.02% $P_2O_5$, lime first | 0.0175 |
| Treated 0.02% $P_2O_5$, acid first | 0.0148 |

EFFECT OF POINT OF ADDITION ON FILTRATION

The prior art practice in the use of the calcium phosphate treatment was to add the acid and lime to the sugar solution in a blending tank, e. g., the tank 10 of Fig. 1. From this tank the solution containing the precipitate was pumped to the filter press, usually after the addition of a filter-aid. As the solids could not be allowed to settle in the tank the flocculent precipitate was subjected to rather strong agitation as produced, and in the tank during the entire progress of the filtration, and also in the press pump itself.

To show the desirable effects produced by changing the point of addition of the reagents to the press feed stream on the discharge side of the pump, and of adding the reagents continuously in proportioned streams, a number of experimental runs were made in a laboratory plant which is substantially a miniature of the plant described in Fig. 1 and in which very close controls could be effected. In these tests the feed pump speed was regulated to maintain a constant flow rate of 2.9 gallons per square foot filtering surface per hour and each test was terminated when the feed pressure reached 60 pounds per square inch. The clarity of the filtrate was determined at 10 minute intervals in the tyndallometer, and corrected for color, and is expressed in percents of complete clarity. Thus, for example, a clarity of 99% means that the clarity of the filtrate is matched by a mixture of 1 part of the unclarified liquor, passed through cloth to remove coarse solids, with 99 parts of the same sugar liquor completely clarified by repeated filtrations.

Figure 2:
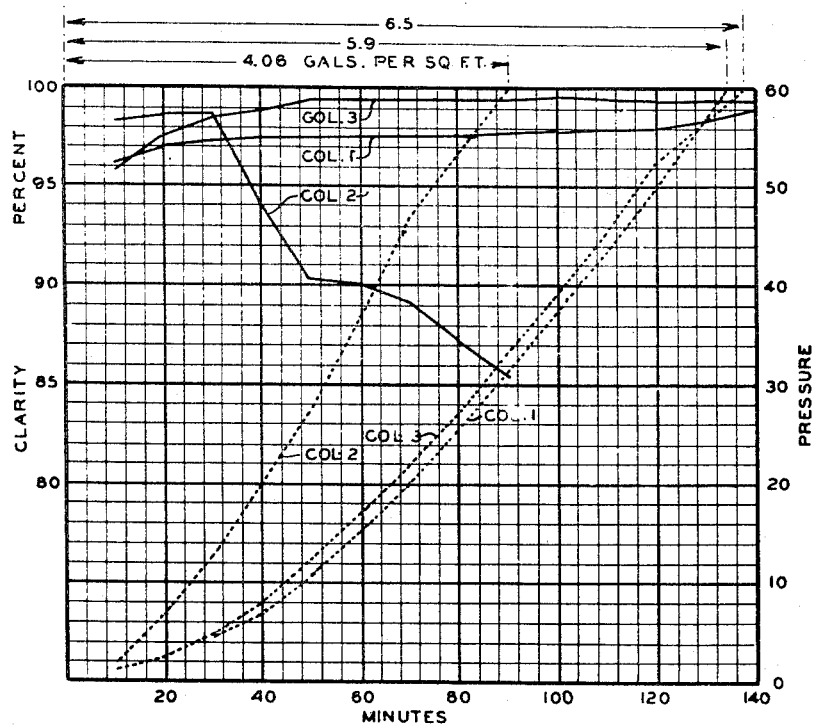
Fig. 2 is a graph illustrating the lengthening of the press cycle and the improvement in clarity resulting from the practice of the invention.

These tests included a clarification with diatomaceous earth filter-aid alone, in the proportion most favorable to high clarity and flow rate (column 1); with a 0.02% dose of phosphoric acid (as $P_2O_5$) and the equivalent quantity of calcium hydroxide, the reagents being added in the mixing tank and pumped to the press as in the prior art practice (column 2), and with the same dosage of reagents added in minute streams in the press pump discharge (column 3). The same quantities of filteraid were added in the two tests including phosphate, the quantity being slightly greater than that used in the straight clarification of column 1. The figures given below are reproduced in graphic form in Fig. 2 of the drawings.

Table 3

| Minutes | Column 1 No Phosphate Earth Only | | Column 2 Reagents to Tank | | Column 3 Reagents to Stream | |
|---|---|---|---|---|---|---|
|  | Pressure | Clarity | Pressure | Clarity | Pressure | Clarity |
| 10 | 1.0 | 96.1 | 2.0 | 98.3 | 1.0 | 95.8 |
| 20 | 2.5 | 97.0 | 7.0 | 98.7 | 2.5 | 97.5 |
| 30 | 4.5 | 97.2 | 13.0 | 98.8 | 5.0 | 98.5 |
| 40 | 7.0 | 97.5 | 20.0 | 94.0 | 8.0 | 98.9 |
| 50 | 11.0 | 97.5 | 27.5 | 90.2 | 12.5 | 99.4 |
| 60 | 15.5 | 97.6 | 37.0 | 90.0 | 17.5 | 99.5 |
| 70 | 20.0 | 97.6 | 46.5 | 89.2 | 22.0 | 99.4 |
| 80 | 25.5 | 97.6 | 55.5 | 87.3 | 27.0 | 99.4 |
| 90 | 31.5 | 97.8 | 60.0 | 85.4 | 33.5 | 99.4 |
| 100 | 37.5 | 97.9 |  |  | 39.0 | 99.6 |
| 110 | 43.5 | 98.0 |  |  | 45.5 | 99.5 |
| 120 | 50.0 | 98.0 |  |  | 52.5 | 99.4 |
| 130 | 57.0 | 98.3 |  |  | 57.0 | 99.4 |
| 140 | 60.0 | 99.0 |  |  | 60.0 | 99.3 |

EFFECT OF ORDER OF ADDITION ON FILTRATION

Figure 3:
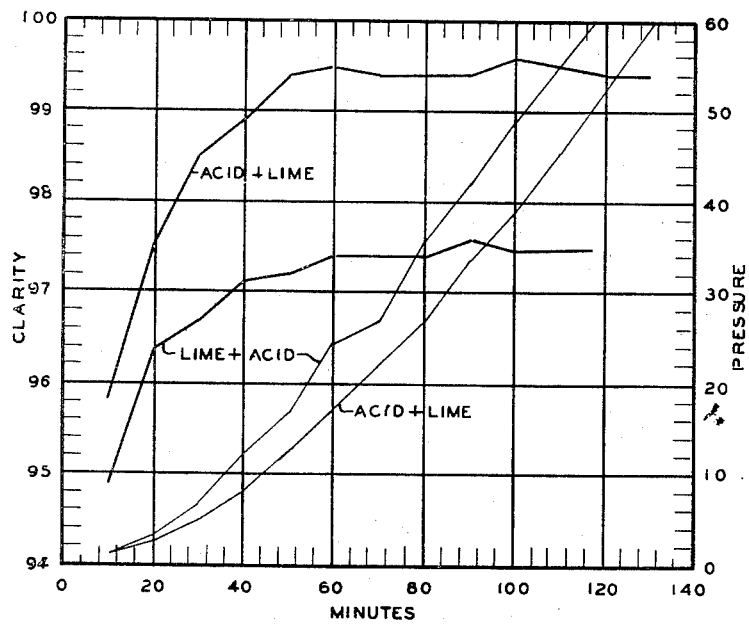
Fig. 3 is a graph illustrating the effects of reversing the order in which the reagents are added to the stream.
Figure 4:
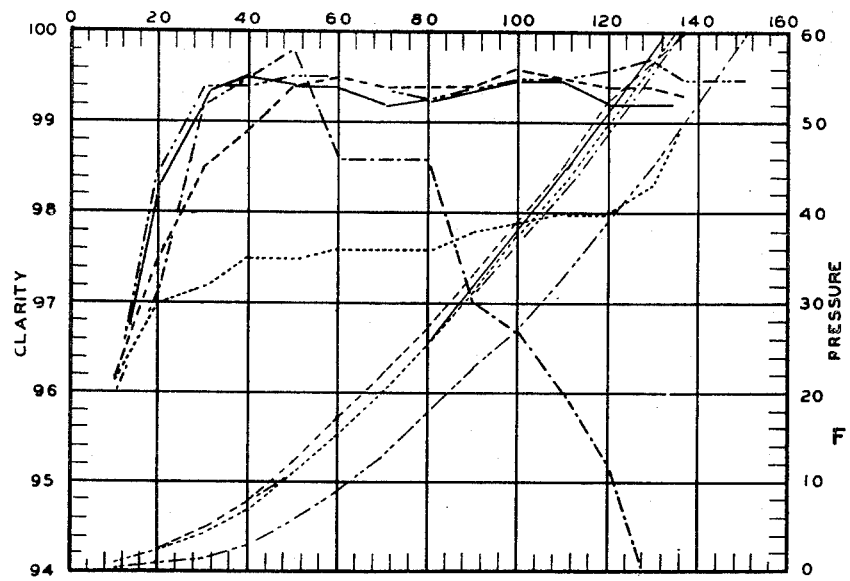
Fig. 4 is a graph illustrating the effects of varying dosage and quality of filter-aid.

The figures (Table 2) relating to color removal indicate the desirability of adding the acid in advance of the lime. This order also gives the best results as regards clarity and length of filtration cycle, as shown by the comparisons in the following table: these figures are also shown graphically in Fig. 3 of the drawings.

Table 4

| Minutes | Column 1 Acid Before Lime | | Column 2 Lime Before Acid | |
|---|---|---|---|---|
|  | Pressure | Clarity | Pressure | Clarity |
| 10 | 1.0 | 95.8 | 1.0 | 94.9 |
| 20 | 2.5 | 97.5 | 3.0 | 96.3 |
| 30 | 5.0 | 98.5 | 7.0 | 96.7 |
| 40 | 8.0 | 98.9 | 12.5 | 97.1 |
| 50 | 12.5 | 99.4 | 17.0 | 97.2 |
| 60 | 17.5 | 99.5 | 24.5 | 97.4 |
| 70 | 22.0 | 99.4 | 27.0 | 97.4 |
| 80 | 27.0 | 99.4 | 36.0 | 97.4 |
| 90 | 33.5 | 99.4 | 42.0 | 97.6 |
| 100 | 39.0 | 99.6 | 49.0 | 97.5 |
| 110 | 45.5 | 99.5 | 55.5 | 97.5 |
| 120 | 52.5 | 99.4 | 60.0 | 97.5 |
| 130 | 57.0 | 99.4 |  |  |
| 140 | 60.0 | 99.3 |  |  |

SELECTION OF A FILTER-AID

In the conventional clarification of sugar liquors with diatomaceous earth filter-aids, without the use of the calcium phosphate treatment, it is good practice to precoat the filter cloths with an earth of relatively slow flow rate (e. g., a filter-aid having a relative flow rate of 1) and to use an earth of faster flow rate (e. g., having a relative flow rate of 2) as the pressure filter-aid, i. e., for admixture with the sugar liquor before it enters the press.

When the calcium phosphate treatment is used as above described, it is feasible to use an earth of even faster flow rate, (e. g. having a relative flow rate of 10), for both precoating and filtration, provided the acid dosage (as $P_2O_5$) is not substantially less than 0.015%. For smaller acid dosages, with the consequent formation of less calcium phosphate floc, the filter aid having a flow rate of 10 does not give satisfactory clarities and it is preferred to use an earth of intermediate flow rate (e. g., a relative flow rate of 3) for both precoating and filtration. The particle size ranges of the four filteraids used in the above experiments, as determined by A. S. T. M. Method D422-39, are given below:

Table 5

| Particle size | Relative flow rate of filter aid | | | |
|---|---|---|---|---|
| | 1 | 2 | 3 | 10 |
| Above 40 microns | 2 | 6 | 3 | 7 |
| 40 to 20 microns | 6 | 9 | 12 | 24 |
| 20 to 10 microns | 17 | 16 | 19 | 32 |
| 10 to 6 microns | 23 | 21 | 26 | 17 |
| 6 to 2 microns | 35 | 41 | 35 | 17 |
| Below 2 microns | 17 | 7 | 5 | 3 |

We are aware that it is old to clarify sugar liquors with the use of filter aids, and that it is old to defecate sugar liquors by forming a precipitate of calcium phosphate therein. We are also aware that attempts have been made to filter such precipitate from sugar liquors with the use of filter aids, though to the best of our knowledge such attempts have met with little success. What we have discovered, and believe to be new, is that on creating a pressure stream of sugar liquor containing a filter aid (preferably diatomaceous earth) together with one of the precipitate-forming reagents (preferably the acid) and adding the other reagent (preferably the lime) to the stream already under pressure, the resultant precipitate is of such coarsely flocculent structure as to be removed with ease and rapidity on passage of the stream through a filtering medium, whereby perfect clarification and a highly important degree of defecation are attained simultaneously and at a minimum of cost.

In the practical application of this discovery it will usually be found most desirable to mix the filter aid with the sugar liquor before pumping and to add the reagents at spaced points to the stream flowing under pressure from the pump to the filter press. It is also possible to mix both the filter aid and one of the reagents with the sugar liquor before pumping and to add the other reagents to the pressure stream on its way to the press. It is also possible, though less convenient, to introduce the filter aid and the two reagents at spaced points between the pump and the press. These three options will produce the same ultimate result, the essential step being to withhold at least one of the precipitate-forming reagents until the turbulence produced by mixing and pumping has subsided and to add it only to the stream flowing under pressure toward the filtering effect.

We claim as our invention:

1. The method of simultaneously clarifying and defecating a sugar liquor by treatment with a filter aid in quantity sufficient for the clarification thereof and with reagents consisting of phosphoric acid and calcium hydroxide which comprises: dispersing said filter aid in said liquor; pumping a stream of said liquor under pressure toward a filtering medium; adding said reagents to said pressure stream individually and at spaced points along its path of flow and gently mixing said liquor after both said reagents have been added, whereby a precipitate of calcium phosphate is formed in said pressure stream, and removing said filter aid and said precipitate by passing said stream under pressure through said filtering medium.

2. The method of simultaneously clarifying and defecating a sugar liquor by treatment with a filter aid in quantity sufficient for the clarification thereof and with reagents consisting of phosphoric acid and calcium hydroxide which comprises: dispersing said filter aid and one of said reagents in said sugar liquor; pumping a stream of said liquor under pressure toward a filtering medium; adding the other of said reagents to said pressure stream and gently intermixing said reagents with said stream, whereby a precipitate of calcium phosphate is formed therein, and removing said filter aid and said precipitate by passing said stream under pressure through said filtering medium.

3. The method of simultaneously clarifying and defecating a sugar liquor by treatment with a filter aid in quantity sufficient for the clarification thereof and with reagents consisting of phosphoric acid and calcium hydroxide which comprises: pumping a stream of said liquor under pressure toward a filtering medium; dispersing said filter aid in said pressure stream and introducing said reagents thereto individually with gentle agitation and at spaced points along its path of flow, whereby a precipitate of calcium phosphate is formed in said pressure stream, and removing said filter aid and said precipitate by passing said stream under pressure through said filtering medium.

4. The method of simultaneously clarifying and defecating a sugar liquor which comprises: dispersing a filter aid in said liquor in quantity sufficient for the clarification thereof; pumping a stream of said liquor under pressure toward a filtering medium; adding phosphoric acid to said stream; introducing a substantially equivalent quantity of calcium hydroxide into said acidified stream and gently intermixing said acid and said hydroxide in said stream, whereby a precipitate of calcium phosphate is formed therein, and removing said filter aid and said precipitate from said stream under pressure by passing said stream through said filtering medium.

5. In the treatment of sugar liquors with reagents consisting of phosphoric acid and calcium hydroxide, the steps of creating by pumping a pressure stream of said liquor containing one of said reagents and a filter aid in quantity sufficient for the clarification of said liquor, of adding the other of said reagents to said stream only after said pumping step has been effected, of gently mixing said liquor after both said reagents have been added, and of removing said filter aid and the precipitate resulting from the combination of said reagents by passing said stream under pressure through a filtering medium.

ARMAND R. BOLLAERT.
GORDON G. HALVORSEN.

REFERENCES CITED

The following references are of record in the file of this patent:

UNITED STATES PATENTS

| Number | Name | Date |
|---|---|---|
| 2,164,186 | Brown | June 27, 1939 |

OTHER REFERENCES

Frankenhoff, "Pressure Filtration of Phosphoric Acid and Lime-Defecated Refinery and Whole Raw Sugar Liquors," Ind. and Engr. Chem., June, 1942, pages 742–744.

Cummings, "Calcium Phosphate in the Filtration of Sugar Liquors," Ind. and Engr. Chem., vol. 34, 1942, No. 4, pages 398–402.

Halvorsen et al., "Defecation of Refinery Syrups," the Int. Sugar Jour., Oct. 1946, pages 264 and 265.